United States Patent

Gottschalk et al.

[11] Patent Number: 6,043,315
[45] Date of Patent: Mar. 28, 2000

[54] FUNCTIONALIZED COPOLYMERS, PROCESS FOR THEIR PRODUCTION, MOULDING COMPOUNDS CONTAINING THEM AND MOULDINGS

[75] Inventors: Axel Gottschalk, Neustadt; Ralf Engelhardt, Ludwigshafen; Jürgen Koch, Neuhofen; Robert Weiss, Kirchheim, all of Germany

[73] Assignee: BASF Aktiengesellschaft, Ludwigshafen, Germany

[21] Appl. No.: 08/930,054

[22] PCT Filed: May 23, 1996

[86] PCT No.: PCT/EP96/02229

§ 371 Date: Nov. 20, 1997

§ 102(e) Date: Nov. 20, 1997

[87] PCT Pub. No.: WO96/38489

PCT Pub. Date: Dec. 5, 1996

[30] Foreign Application Priority Data

May 31, 1995 [DE] Germany ............... 195 19 855

[51] Int. Cl.$^7$ ............... C08L 53/02; C08L 71/00; C08L 77/00
[52] U.S. Cl. ............... 525/92 B; 525/66; 525/68; 525/71; 525/92 D; 525/132; 525/151; 525/152; 525/171; 525/299; 525/301; 524/505; 524/538
[58] Field of Search ............... 525/92 B, 92 D, 525/314, 71, 68, 66, 132, 151, 152, 171, 250, 271, 299, 301; 524/505, 538

[56] References Cited

U.S. PATENT DOCUMENTS

| | | | |
|---|---|---|---|
| 3,135,716 | 6/1964 | Uraneck et al. | 525/122 |
| 4,409,357 | 10/1983 | Milkovich | 524/505 |
| 4,642,358 | 2/1987 | Aycock et al. | 549/245 |
| 4,948,832 | 8/1990 | Ostermayer et al. | 524/504 |
| 4,960,831 | 10/1990 | Willis et al. | 525/250 |
| 5,132,365 | 7/1992 | Gallucci | 525/92 |
| 5,147,942 | 9/1992 | Abe et al. | 525/397 |

FOREIGN PATENT DOCUMENTS

| | | |
|---|---|---|
| 214 400 | 3/1987 | European Pat. Off. . |
| 255 001 | 2/1988 | European Pat. Off. . |
| 319 833 | 6/1989 | European Pat. Off. . |
| 440 939 | 8/1991 | European Pat. Off. . |
| 629 676 | 12/1994 | European Pat. Off. . |
| 31 18 629 | 11/1982 | Germany . |
| 41 29 499 | 3/1993 | Germany . |

OTHER PUBLICATIONS

J. Poly. Sci, vol. 26, 2031–2037 (1988).
J. Poly. Sci. vol. 29, 1329–1338 (1991).

*Primary Examiner*—Mark L. Warzel
*Attorney, Agent, or Firm*—Keil & Weinkauf

[57] ABSTRACT

A functionalized copolymer of the formula $$A—B—Z—X$$

where
A is a block of vinylaromatic monomers of 8 to 20, preferably 8 to 12, carbon atoms,
B is a block of alkadiene monomers of 4 to 12, preferably 4 to 8, carbon atoms,
Z is a fundamental building block of a compound having sterically hindering groups and
X is a functionalized fundamental building block,
a process for its preparation, thermoplastic molding materials containing said copolymer, processes for their preparation, the use for the production of moldings and moldings comprising said molding materials.

14 Claims, No Drawings

FUNCTIONALIZED COPOLYMERS, PROCESS FOR THEIR PRODUCTION, MOULDING COMPOUNDS CONTAINING THEM AND MOULDINGS

The present invention relates to a functionalized copolymer of the formula

A—B—Z—X where
A is a block of vinylaromatic monomers of 8 to 20, preferably 8 to 12, carbon atoms,
B is a block of alkadiene monomers of 4 to 12, preferably 4 to 8, carbon atoms,
Z is a fundamental building block of a compound having sterically hindering groups and
X is a functionalized fundamental building block.

Inhapak, J. W. Barlow and Paul, Terminal Anhydride Functionalization of Polystyrene, J. of Polymer Science, Part A, Polymer Chemistry, 29 (1993), 1329–1338 describe the preparation of terminally anhydride-functionalized polystyrene. Styrene is subjected to anionic polymerization and the resulting polystyryllithium is directly coupled with trimellitic an hydride chloride (TMAC) at the end of the i onic polymerization of styrene. The degree of functionalization of the polymer is not more than 61% in this direct functionalization. TMAC-functionalized polystyrenes were also obtained by reacting hydroxyl-terminated polystyrene and TMAC. In this reaction for the indirect functionalization, degrees of functionalization of up to 85% are achieved. However, the feasibility of the process depends on the availability of hydroxyl-terminated polymer, which is obtainable by anionic polymerization and subsequent reaction to with ethylene oxide at the end of the polymerization (R. P. Quirk and J. -J. Ma, J. Polym. Sci. Polym. Chem. Ed. 26 (1988), 2031). Polystyrenes functionalized in this manner can be used for compatibilizing the polymer blend components for the in situ formation of block copolymers in polymer blends.

The indirect functionalization has the disadvantage that toxicologically unsafe ethylene oxide has to be used in the process.

Reinforced blends of PPE and high impact polystyrene, which are used as molding materials in many areas of industry, are known per se. In many applications, high tensile strength and flowability of the material are decisive.

DE 31 18 629 A1 discloses molding materials comprising polyphenylene ethers and high impact styrene polymers, which molding materials contain, as a further component, a polyorganosiloxane to impart high flowability to the molding material. If these molding materials are reinforced, the rigidity of the reinforced molding material is not sufficiently large for all applications.

EP-B1 0 214 400 describes resin compositions comprising polyphenylene ether resin and styrene resin, which compositions additionally have a cyclopentadiene resin which contains a polar group in order to improve the flowability of the resin composition. In this resin composition, too, the mechanical properties are unsatisfactory for many applications.

EP-A 0 319 833 describes reinforced thermoplastic molding materials which contain polyphenylene ether, a high impact polystyrene polymer and a further copolymer of styrene and tert-butyl acrylate. The copolymer of styrene and tert-butyl acrylate serves for improving the mechanical properties, but the molding material has insufficient flowability.

It is an object of the present invention to provide a functionalized copolymer of vinylaromatic monomers and alkadiene monomers.

It is a further object of the present invention to provide a functionalized copolymer of vinylaromatic monomers and alkadiene monomers, the degree of functionalization being as high as possible.

It is a further object of the present invention to provide a functionalized polymer of vinylaromatic monomers and alkadiene monomers, the functionalization involving no fundamental ethylene oxide building blocks.

It is a further object of the present invention to provide a process for the preparation of the functionalized copolymers.

It is a further object of the present invention to provide a process for the preparation of the functionalized copolymers, the use of toxicologically unsafe ethylene oxide being dispensed with.

It is a further object of the present invention to provide reinforced thermoplastic molding materials which have great rigidity and toughness.

It is a further object of the present invention to provide reinforced thermoplastic molding materials which have very good tensile strength and at the same time flowability.

It is a further object of the present invention to provide thermoplastic molding materials which have great rigidity and toughness.

It is a further object of the present invention to provide thermoplastic molding materials which have great toughness or high impact strength.

It is a further object of the present invention to provide a process for the preparation of these (reinforced) thermoplastic molding materials.

It is a further object of the present invention to provide mouldings which have good rigidity, toughness and tensile strength.

We have found that these and further objects are achieved by a functionalized copolymer as defined at the outset and by a process for its preparation, (reinforced) thermoplastic molding materials, processes for their preparation and mold-ings as defined in the patent claims. Preferred functionalized copolymers are described in the subclaims. Uses of the functionalized copolymer and of the (reinforced) thermoplastic molding materials are described in the claims.

Functionalized copolymer (component (a))

The novel functionalized polymer has the formula:

A—B—Z—X where
A is a block of vinylaromatic monomers of 8 to 20, preferably 8 to 12, carbon atoms,
B is a block of alkadiene monomers of 4 to 12, preferably 4 to 8, carbon atoms,
Z is a fundamental building block of a compound having sterically hindering groups and
X is a functionalized fundamental building block.

According to one embodiment of the invention, the degree of functionalization of the copolymer is at least 35%, preferably at least 65%, particularly preferably at least 85% and is particularly preferably greater than 85%, in particular at least 90%.

According to the invention, the block A may be composed of one type or a plurality of types of vinylaromatic monomers, ie. may be a homopolymer or copolymer.

One group of monomers which may be used according to the invention for A comprises styrene monomers. The styrene monomers may be unsubstituted or substituted by $C_1$–$C_{12}$-alkyl, preferably $C_1$–$C_4$-alkyl, on the aromatic nucleus or on the vinyl group. One or more straight-chain or branched alkyl radicals may be present as substituents. It is also possible for both the aromatic nucleus (benzene nucleus) and the vinyl group of the styrene monomers to be substituted.

Examples of styrenes which may be used according to the invention are styrene, α-methylstyrene, p-methylstyrene, vinyltoluene and p-tert-butylstyrene, particularly preferably styrene.

Monomers which contain a polynuclear aromatic radical on the vinyl group may also be used. A suitable radical is, for example, a naphthyl radical, which may be alkyl-substituted as described above.

According to the invention, the block B may be composed of one type or a plurality of types of alkadiene monomers, ie. may be a homopolymer or copolymer.

Monomers which may be used according to the invention for B are alkadienes of 4 to 12, preferably 4 to 8, carbon atoms. The alkadiene may be unsubstituted or may carry one or more alkyl substituents. Examples of unsubstituted alkadienes are 1,4-butadiene, 1,3-pentadiene, conjugated hexadienes, heptadienes or octadienes, as well as cyclic dienes, such as cyclopentadiene. Alkyl-substituted dienes are, for example, isoprene and 2,3-dimethylbutadiene. Alkadienes substituted by aromatic radicals, for example phenylbutadiene, may also be used. Further suitable conjugated dienes which can be subjected to anionic polymerization are known to a person skilled in the art. 1,4-Butadiene and isoprene and mixtures thereof are preferred.

The alkyl substituents are preferably of 1 to 8, particularly preferably 1 to 4, carbon atoms.

The blocks A and B may have a well defined transition, i.e. the block A is covalently bonded to the block B. However, the transition may also be tapered, ie. the block A has an increasing number of fundamental alkadiene building blocks in the vicinity of the block B, it being possible for segments of fundamental vinylaromatic building blocks and fundamental alkadiene building blocks to alternate with one another. Likewise, the block B may have fundamental vinylaromatic building blocks in the vicinity of block A in the same manner. This results in not a well defined but a tapered transition between blocks A and B.

The functionalized copolymer may also contain a random A/B copolymer, fundamental vinylaromatic building blocks and fundamental alkadiene building blocks being randomly distributed in the polymer skeleton. It is also possible for a large number of alternating blocks A and B having the same or different chain lengths to be present.

According to a preferred embodiment of the invention, a well defined transition is present between the block A and the block B.

According to one embodiment of the invention, at least some of the blocks B have elastomeric properties. According to one embodiment of the invention, some of the aliphatic unsaturated bonds in the block B can be saturated by hydrogenation, the aliphatic unsaturated bonds having a degree of hydrogenation of from 50 to 100%, preferably from 70 to 100%, in particular from 90 to 100%.

Z is a fundamental building block of a compound having sterically hindering (bulky) groups.

The compound is preferably a vinyl monomer which is substituted by sterically hindering groups at least on one carbon atom. Preferably, the vinyl group is substituted on a carbon atom by two aromatic radicals, preferably by vinyl radicals, which in turn may be substituted by the alkyl radical described above for the monomers of block A and by further substituents. For example, an alkyl radical which has, preferably, 1–4 carbon atoms and may in turn be substituted as described can be bonded to the other carbon atom of the vinyl group. According to one embodiment of the invention, the vinyl group substituted by sterically hindering groups has a total of 14–22 carbon atoms.

Thus, the fundamental building block Z is preferably a diarylalkylene group of 14 to 22 carbon atoms, in particular a 1,1-diarylethylene group of the formula

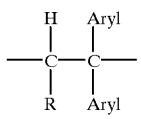

where R is hydrogen or alkyl of 1 to 4 carbon atoms and Aryl is aryl of 6 to 10 carbon atoms, preferably phenyl.

X is a functionalized fundamental building block. According to one embodiment of the invention, the functional group(s) is/are such that they are capable of forming a strong bond, in particular a covalent bond, with a reinforcing agent, preferably a glass fiber or silanized glass fiber, in a molding material, as described below for the molding materials.

The functional group with which the covalent bond to the fundamental building block Z is achieved may be any desired functional group suitable for this purpose. Preferably, it is hydroxyl or halogen, preferably chlorine. The functional group X is preferably a hydrocarbon group carrying an acid anhydride group, in particular an aryl group carrying an acid anhydride group. The functional group is bonded to the carbon atom which also carries the aryl radicals. The functional group X is an anhydride group or an acid anhydride group. The anhydride group and acid anhydride group are preferably of 2 to 8 carbon atoms. Preferred examples of the functional group X are the acid anhydride radical derived from trimellitic acid.

According to one embodiment, this functional group serves for forming a strong bond, in particular a covalent bond, with a reinforcing agent, preferably a glass fiber or a silanized glass fiber, in a molding material, as described below. The difunctional or polyfunctional compound or the functionalized fundamental building block X may contain, for example, OH, COOH, COOR, SH, NCO or $NH_2$ as this functional group. It preferably contains an $NH_2$ group or an acid anhydride group, in particular an acid anhydride group.

According to one embodiment of the invention, a difunctional or polyfunctional compound introducing the functionalized fundamental building block X may be of the formula

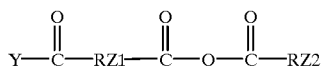

where RZ1 and RZ2 are each a hydrocarbon radical of, preferably, 1 to 10 carbon atoms, it also being possible for the radicals RZ1 and RZ2 together to form a hydrocarbon ring structure, in particular an aromatic ring, preferably a benzene ring, or a cycloalkyl ring, and the two carbon atoms of the acid anhydride group preferably being bonded to neighboring carbon atoms of the ring structure. Y is hydroxyl or halogen, preferably chlorine. Preferred examples of the functionalized fundamental building block X are the acid anhydride radical derived from trimellitic acid, in particular in the following configurations:

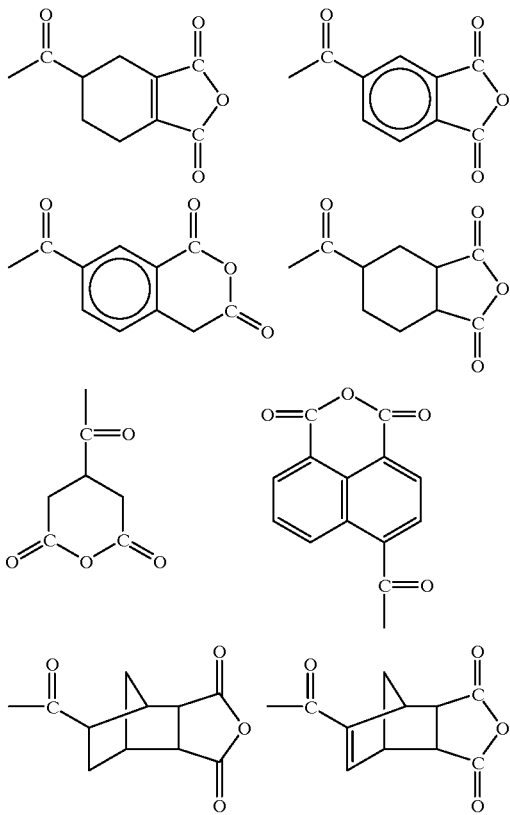

The 1,2-anhydride or 1,2-anhydride chloride of 1,2,4-benzenetricarboxylic acid (trimellitic acid), chloroethanoylsuccinic anhydride, chloroformylsuccinic anhydride or 1-acetoxyacetyl-3,4-phthalic anhydride is preferably used as the difunctional or polyfunctional compound introducing fundamental building block X, trimellitic anhydride chloride being particularly preferred. According to the invention, other compounds which have both an acid anhydride function and an acid halide or acid function may also be used for the preparation of the functionalized polymer.

According to one embodiment of the invention, the fundamental building blocks Z and X preferably contain no fundamental ethylene oxide building blocks which are present in the main chain.

The weight average molecular weight of the functionalized copolymer is, according to the invention, preferably from 10,000 to 500,000, in particular from 20,000 to 200,000. The average molecular weight of the alkadiene block B is not critical within wide ranges. Advantageously, this block has a molecular weight which is about the same as or lower than that of the block A of vinylaromatic monomers. According to one embodiment of the invention, the weight ratio of block A to block B is from 1:9 to 9:1. Preferably, homopolymers of the two blocks each have a weight average molecular weight of from 10,000 to 100,000. The molecular weight is determined with the aid of gel permeation chromatography against polystyrene calibration standards.

The degree of functionalization of the functionalized copolymer is determined by $^1$H-NMR but may also be determined by potentiometry or by titration against bases using suitable indicators.

Preparation of the functionalized copolymer

According to the invention, it was found that the functionalized copolymers, preferably having a high degree of functionalization, are obtained when the living anion of the copolymer block A—B is first reacted with compounds carrying sterically hindering groups, such as 1,1-diphenylethylene, and the product obtained is reacted with a difunctional or polyfunctional compound, such as trimellitic anhydride chloride. In this procedure, the degree of functionalization, which can be determined by IR spectroscopy or titration, is preferably at least 35%, particularly preferably at least 60%, in particular greater than 85%, especially at least 90%.

In contrast to the indirect functionalization method described by Park, Barlow and Paul, the use of toxicologically unsafe ethylene oxide can be dispensed with. In contrast, the diphenylethylene used according to the invention is toxicologically safe.

In one preparation of functionalized copolymers based on the indirect functionalization method described by Park, Barlow and Paul, only very low degrees of functionalization, ie. 25 or 30%, were achieved.

A functionalized copolymer as described above can be prepared by a process wherein a) vinylaromatic monomers and alkadiene monomers are subjected to anionic polymerization to give a first living copolymer of the formula A—B$^-$ containing a block A and a block B, b) the first living copolymer is reacted with a compound having sterically hindering groups to give a second living copolymer of the formula A—B—Z$^\ominus$ and c) the second living copolymer is reacted with a difunctional or polyfunctional compound to give a copolymer of the formula A—B—Z—X, the abbreviations used here having the same meanings as in the polymer claims.

Anionic polymerization processes for the preparation of the copolymer of block A and B are described in detail, for example, in U.S. Pat. Nos. 3,251,905, 3,390,207, 3,598,887 and 4,219,627. Suitable initiators for the polymerization are organo-alkali metal compounds, preferably lithium alkyls, eg. methyllithium, ethyllithium, n-butyllithium, sec-butyllithium or isopropyllithium. n-Butyllithium or sec-butyllithium is particularly preferably used.

The preparation of other mono- or difunctional anionic polymers is also known and has been described, inter alia, in EP 0 303 177, EP 0 295 675, U.S. Pat. No. 4,950,721, DE 36 39 569 and DE 35 37 771.

Particularly suitable solvents for the anionic polymerization for the preparation of the novel functionalized copolymers are straight-chain or branched aliphatic hydrocarbons, eg. n-octane or n-hexane, and unsubstituted or substituted cycloaliphatic and aromatic hydrocarbons, such as cyclohexane, methylcyclohexane, toluene or benzene, or any desired mixture of the aliphatic, cycloaliphatic and aromatic hydrocarbons. Cyclohexane is preferably used as the solvent.

Other suitable solvent components are ethers, such as tetrahydrofuran or diethyl ether, and tertiary amines, eg. tetramethylethylenediamine or pyridine, in concentrations of from 0.01 to 20, preferably from 0.01 to 2, % by weight. Tetrahydrofuran is preferred.

All starting materials must be freed from oxygen- and proton-active impurities, which can be effected, for example, by contact with metal organyls or by adsorptive purification, for example using calcium hydride. The polymerization is preferably carried out under inert gas conditions at from −100 to +120° C., preferably from −80 to +80° C.

According to one embodiment of the invention, the vinylaromatic monomers for the formation of block A are completely polymerized in a first polymerization step and, in a second polymerization step, block A is completely reacted with the alkadiene monomers for the formation of the block B. Well defined transitions between the individual blocks result.

According to one embodiment of the present invention, novel copolymers can be prepared by first producing the fundamental structure

as a living copolymer in a manner known per se by anionic polymerization, preferably with the use of lithium initiators, in particular alkyllithium, particularly preferably n-butyllithium or secondary butyllithium. This living copolymer is then reacted, in a second stage, with a molecule of a compound of the formula

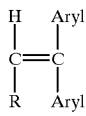

to prepare a second living copolymer

This further living copolymer is finally reacted, in a further stage, with a difunctional or polyfunctional compound which introduces a functionalized fundamental building block X. One functional group serves for enabling covalent bonding of the fundamental building block X to Z and at least one further functional group provides the functionalization of the fundamental building block and hence of the copolymer. If, according to the invention, the difunctional or polyfunctional compound has, for example, a hydroxyl group or a halogen atom, preferably a chlorine atom, preferably in an acid or acid chloride group, as a functional group which permits bonding to the fundamental building block Z, a halide ion or an OH$^-$ ion is eliminated with formation of a covalent bond between the fundamental building block Z and the functionalized fundamental building block X. This results in the formation of the uncharged functionalized copolymer of the invention, whose functionalization is as described above.

The individual stages of the novel process are preferably carried out under the following conditions:
(a) The polymerization of the vinylaromatic and alkadiene with a lithium initiator is carried out at from −100 to 100° C., preferably from −20 to 80° C.
(b) The reaction of the living copolymer with CHR=CAryl$_2$ is likewise carried out at from −100 to 100° C., preferably from −20 to 80° C.
(c) The introduction of the functional group into the further living copolymer with elimination of the lithium is effected at from −100 to 50° C., preferably from −20 to 30° C.

For isolation of the copolymer, the polymerization mixture can be either heated directly to dryness or treated with steam, by known methods, the solvent being distilled off. It may also be precipitated in an excess of a nonsolvent, eg. ethanol, and mechanically isolated and dried or worked up by devolatilization in an extruder.

The reaction mixture is worked up, for example, by precipitating the functionalized copolymer with petroleum ether, filtering off with suction and drying the precipitate.

According to one embodiment of the invention, the functionalized copolymers thus obtained can be converted by hydrogenation by conventional methods into copolymers in which some or all of the aliphatic unsaturated bonds are saturated, ie. they have a degree of hydrogenation of from 5 to 100%, preferably from 70 to 100%, in particular from 90 to 100%.

The hydrogenation is preferably carried out using molecular hydrogen and catalysts based on metals or metal salts of group eight of the Periodic Table. It may be effected in the heterogeneous phase, for example using Raney nickel or, preferably, in the homogeneous phase using catalysts based on salts, in particular carboxylates, alkoxides or enolates of cobalt, of nickel or of iron, which are combined with metal alkyls, in particular with aluminum alkyls, or homogeneously by diamines produced in situ from, for example, tosyl hydrazide. Appropriate processes are described, for example, in U.S. Pat. Nos. 3,113,986 and 4,226,952.

According to one embodiment of the invention, the functionalized copolymer has a block A of vinylaromatic monomers which is compatible with polyphenylene ether and polystyrene. The compatibility of two polymer components is understood in general as meaning the miscibility of the components or the tendency of one polymer to dissolve in the other polymer component (cf. B. Vollmert, Grundriβ der Makromolekularen Chemie, Volume IV, page 222 et seq., E. Vollmert Verlag, 1979). Two polymers are all the more compatible the smaller the difference between their solubility parameters. Such parameters and the enthalpy of mixing cannot be determined in a standard manner for all polymers, so that the solubility can be determined only directly, for example by torsional vibration or DTA measurements. The examples of preferred vinylaromatic polymers compatible with polyphenylene ethers are given in the monograph by O. Olabisi, Polymer-Polymer Miscibility, 1979, pages 224 to 330 and 245. The functionalized fundamental building block X is capable of forming a bond with reinforcing agents, such as glass fibers or silanized glass fibers, in order to bind them strongly. Consequently, the functionalized polymer can be used in polyphenylene ether/polystyrene mixtures or blends, which may contain reinforcing agents, and can be used for the preparation of unreinforced or reinforced, thermoplastic molding materials.

Thermoplastic molding materials containing polyphenylene ether

We have found that the objects of the present invention are achieved by the thermoplastic molding material which is described in the claims, is reinforced according to one embodiment and contains polyphenylene ethers. Said molding material contains
(a) from 0.1 to 20% by weight of at least one functionalized copolymer as defined in one of the copolymer claims,
(b) from 1 to 98.9% by weight of at least one polyphenylene ether,
(c) from 1 to 98.9% by weight of at least one vinylaromatic polymer,
(d) from 0 to 50% by weight of at least one reinforcing agent and
(e) from 0 to 60% by weight of further additives and/or processing assistants,
the amounts of components (a) to (e) together being 100% by weight.

Preferably, the novel, unreinforced or reinforced thermoplastic molding materials contain 0.2–15, in particular 0.5–10, % by weight of component (a), 1–97.9, particularly preferably 20–89.9, in particular 35–79.5, % by weight of component (b), 1–97.9, particularly preferably 5–60, in particular 10–45, % by weight of component (c), 1–50, particularly preferably 5–45, in particular 10–40, % by weight of component (d) and 0–30, in particular 0–20, % by weight of component (e).

The amounts of components (a)–(e) together are always 100% by weight.

The individual components are described in more detail below.

Polyphenylene ether of component (b)

The polyphenylene ether of component (b) is present in the novel reinforced thermoplastic molding materials in an amount of from 1 to 98.9, preferably from 1 to 97.9, particularly preferably from 20 to 89.9, in particular from 40 to 79.5, % by weight, based on reinforced thermoplastic molding material. The polyphenylene ethers (b) contained in the novel molding materials are known per se. They are prepared by conventional processes, by oxidative coupling of phenols disubstituted in the ortho position by alkyl, alkoxy, chlorine or bromine (cf. U.S. Pat. Nos. 3,661,848, 3,378,505, 3,306,874, 3,306,875 and 3,639,656). The alkyl or alkoxy groups, which preferably contain 1 to 4 carbon atoms but no alpha tertiary hydrogen atoms, may in turn be substituted by chlorine or bromine. Suitable polyphenylene ethers are, for example, poly-2,6-diethyl-1,4-phenylene ether, poly-2-methyl-6-ethyl-1,4-phenylene ether, poly-2-methyl-6-propyl-1,4-phenylene ether, poly-2,6-dipropyl-1,4-phenylene ether, poly-2-ethyl-6-propyl-1,4-phenylene ether, poly-2,6-dichloro-1,4-phenylene ether and poly-2,6-dibromo-1,4-phenylene ether or copolymers such as those which contain 2,3,6-trimethylphenol, and polymer blends. Poly-2,6-dimethyl-1,4-phenylene ether is preferred. The polyphenylene ethers generally have a relative viscosity of from 0.3 to 0.7 dl/g, measured in 1% strength by weight solution in chloroform at 25° C.

Preferably used polyphenylene ethers are those which are compatible with vinylaromatic polymers, ie. completely or very substantially soluble in these polymers (cf. A. Noshay, Block Copolymers, pages 8 to 10, Academic Press, 1977, and O. Olabisi, Polymer-Polymer Miscibility, 1979, pages 117 to 189).

Graft copolymers of polyphenylene ethers and vinylaromatic polymers, such as those of styrene, α-methylstyrene, vinyltoluene and chlorostyrene, may also be used as polyphenylene ether component (b).

In the present invention, modified polyphenylene ethers may be used, as disclosed, for example, in WO 86/2086, WO 87/0540, EP-A 222 246, EP-A 223 116 and EP-A 254 048.

Vinylaromatic polymers of component (c)

According to the invention, the vinylaromatic polymers are used in amounts of from 1 to 98.9, preferably from 1 to 97.9, particularly preferably from 5 to 60, in particular from 10 to 45, % by weight, based on the reinforced thermoplastic molding material.

Vinylaromatic polymers, in particular polystyrenes of component (c), are known per se, for example from EP-A-0 319 833.

Suitable vinylaromatic polymers are, for example, all conventional homo- and copolymers of styrene. Usually, the weight average molecular weights ($M_W$) of the conventional styrene polymers are from 150,000 to 300,000. Suitable styrene polymers are predominantly prepared from styrene as well as from styrenes alkylated with $C_1$–$C_4$-alkyl in the nucleus or side chain, such as α-methylstyrene or p-methylstyrene, by the known mass, solution or suspension methods (cf. Ullmanns Enzyklopädie der technischen Chemie, Volume 19, pages 265 to 272, Verlag Chemie, Weinheim 1980).

The vinylaromatic polymers of component (c) may also be toughened by admixing small amounts, preferably from 2 to 20% by weight, based on the styrene polymer, of an acrylate rubber or of a polymer of a conjugated diene, such as butadiene or isoprene. The diene polymers may be partially or completely hydrogenated. The rubber or the diene polymer should have a glass transition temperature of less than 0C, measured according to K. H. Illers and H. Breuer, Kolloidzeitschrift 176 (1961), 110. Conventional rubbers, such as polybutadiene rubber, acrylate rubber, styrene/butadiene rubber, hydrogenated styrene/butadiene rubber, acrylonitrile/butadiene rubber, polyisoprene rubber, ionomers, styrene/butadiene block copolymers, including AB, ABA and ABAB tapered block copolymers, star block copolymers and similar, analogous isoprene block copolymers and in particular (partially) hydrogenated block copolymers, as disclosed in EP-A-62 283, are suitable. Such synthetic rubbers are familiar to persons skilled in the art and are summarized, together with the unsuitable EPDM rubbers, in Ullmanns Enzyklopädie der technischen Chemie, 4th Edition, Volume 13, pages 595 to 634, Verlag Chemie GmbH, 1977.

The toughening may preferably be achieved also by preparing the styrene polymers in the presence of small amounts, for example from 2 to 20% by weight, based on the styrene polymer, of a rubber-like polymer based on a conjugated diene, if desired an acrylate rubber (HIPS). Rubber-like polymers based on butadiene, for example styrene/butadiene polymers, polybutadiene and furthermore butadiene/styrene block copolymers are suitable. These styrene polymers toughened in a certain manner are familiar to a skilled worker from the literature and in practice, so that a more detailed explanation appears superfluous at this point (cf. Ullmans Enzyklopädie der technischen Chemie, 4th Edition, Volume 19, pages 272 to 295, Verlag Chemie GmbH, 1980).

Suitable high impact polystyrenes are described, for example, in DE 31 18 629 A1, as are also processes for their preparation.

Reinforcing agents of component (d)

According to one embodiment of the invention, the molding materials containing polyphenylene ethers may be free of reinforcing agents.

According to a further embodiment of the invention, however, the molding materials containing polyphenylene ethers contain a reinforcing agent. This embodiment is described below.

According to the invention, the reinforcing agents are used in amounts of from 1 to 50, preferably from 5 to 45, in particular from 10 to 40, % by weight, based on the reinforced thermoplastic molding material.

The novel molding materials contain, as component (d), conventional reinforcing materials, such as glass fibers, glass beads, mineral fibers, alumina fibers, carbon fibers, potassium titanate whiskers or Aramid fibers. Carbon fibers, potassium titanate whiskers, Aramid fibers and glass fibers are preferred, in particular glass fibers.

The glass fibers may comprise E, A or C glass. Their diameter is in general from 6 to 20 μm. Both rovings and chopped glass fibers having a length of from 1 to 10 mm, preferably from 3 to 6 mm, or short glass fibers having a length of from 0.05 to 1.5 mm, may be used.

According to one embodiment of the present invention, the reinforcing agents of component (d) are untreated.

According to a further preferred embodiment of the invention, the reinforcing agents of component (d) are coated or sized. This coat or size covers the reinforcing agents of component (d), in particular the glass fibers, preferably uniformly over the total surface.

According to one embodiment of the invention, the coating or size is a silane compound. Suitable silane compounds are those of the general formula $$(X\text{---}CH_2)_n)_K\text{---}Si\text{---}(O\text{---}C_mH_{2m+1})_{4-K}$$

where
X is $NH_2$-, or HO—,
n is an integer from 2 to 10, preferably 3 or 4,
m is an integer from 1 to 5, preferably 1 or 2, and
k is an integer from 1 to 3, preferably 1.

Preferred silane compounds are aminopropyltrimethoxysilane, aminobutyltrimethoxysilane, aminopropyltriethoxysilane, aminobutyltriethoxysilane and the corresponding silanes which contain a glycidyl group as substituent X.

The silane compounds are used in general in amounts of from 0.05 to 5, preferably from 0.5 to 1.5, in particular from 0.8 to 1, % by weight (based on the reinforcing agents of component (d)) for surface coating.

The coated or sized reinforcing agents of component (d), preferably the coated glass fibers or glass fibers sized as above, can be particularly readily reacted with the functionalized copolymer of component (a). This results in a strong bond between the functionalized copolymer of component (a) and the reinforcing agent (d), in particular the glass fiber. Since the polymer block A of the functionalized polymer is compatible with the polyphenylene ether of component (b) and with the vinylaromatic polymer of component (c), the reinforcing agents of component (d) are thoroughly distributed in the novel molding materials and are intimately associated therewith, leading to improved tensile strength and a high modulus of elasticity.

Additives and processing assistants of component (e)

The conventional additives and/or processing assistants used as component (e) are employed in amounts of from 0 to 60, preferably from 0 to 30, in particular from 0 to 20, % by weight, based on the reinforced thermoplastic molding material.

Particularly suitable conventional additives and processing assistants are particulate fillers, antioxidants, flameproofing agents, conventional heat and light stabilizers, lubricants and mold release agents, colorants, dyes, plasticizers and pigments in conventional amounts. In addition, polymers other than the stated ones, for example vinylaromatic-based polymers, polyamides as described, for example, below as component (f), and/or rubbers may be added to the novel reinforced molding materials.

Particulate fillers as constituents of component (e) are preferably selected from the following group: amorphous silica, magnesium carbonate, powdered quartz, mica, talc, feldspar, wollastonite and kaolin, in particular calcined kaolin.

Preferred combinations of components (d) and (e) are, for example, 20% by weight of glass fibers with 15% by weight of wollastonite and 15% by weight of glass fibers with 15% by weight of wollastonite. The stated percentages by weight are based in each case on the total amount of components (a) to (e).

Finally, other preferred reinforced thermoplastic molding materials are those which contain, as parts of components (e), flameproofing agents from the following group: polyhalobiphenyl, polyhalodiphenyl ether, polyhalophthalic acid and derivatives thereof, polyhalooligocarbonates, polyhalopolycarbonates and phosphorus compounds.

Examples of flameproofing agents are polymers of 2,6,2',6'-tetrabromobisphenol A, of tetrabromophthalic acid, of 2,6-dibromophenol and of 2,4,6-tribromophenol and derivatives thereof.

A preferred flameproofing agent is elemental phosphorus. As a rule, the elemental phosphorus may be desensitized or coated with, for example, polyurethanes or aminoplasts. Concentrates of red phosphorus, for example in a polyamide, elastomer or polyolefin, are also suitable. Combinations of elemental phosphorus with 1,2,3,4,7,8,9,10,13,13,14,14-dodecachloro-1,4,4a,5,6,6a,7,10,10a,11,12,12a-dodecahydro-1,4:7,10-dimethanodibenzo[a,e]cyclooctane and, if required, a synergistic agent, eg. antimony trioxide, are particularly preferred.

Phosphorus compounds, such as organic phosphates, phosphonates, phosphinates, phosphine oxides, phosphines or phosphites, are also preferred. Examples are triphenylphosphine oxide and triphenyl phosphate and resorcinol-bistriphenylphosphine oxide. This may be used alone or as a mixture with hexabromobenzene or with a chlorinated biphenyl and, if required, antimony oxide.

Typical of the preferred phosphorus compounds which may be used according to the invention are those of the general formula

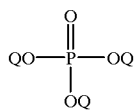

where Q are identical or different radicals and are hydrocarbon radicals, such as alkyl, cycloalkyl, aryl, alkyl-substituted aryl or aryl-substituted alkyl, or halogen, hydrogen or combinations thereof, provided that at least one of the radicals Q is aryl.

Examples of such suitable phosphates are: phenyl bis-dodecyl phosphate, phenyl bisneopentyl phosphate, phenyl ethylene hydrogen phosphate, phenyl bis(3,5,5-trimethylhexyl) phosphate, ethyl diphenyl phosphate, 2-ethylhexyl di(p-tolyl) phosphate, bis(2-ethylhexyl) phenyl phosphate, tri(nonylphenyl) phosphate, phenyl methyl hydrogen phosphate, di(dodecyl) p-tolyl phosphate, tricresyl phosphate, triphenyl phosphate, dibutyl phenyl phosphate and diphenyl hydrogen phosphate. The preferred phosphates are those in which each Q is aryl. The most preferred phosphates are triphenyl phosphate, triphenyl phosphine oxide and phenylbistriphenylphosphine oxide.

Furthermore, the combination of triphenyl phosphate with hexabromobenzene and antimony trioxide is preferred.

Other suitable flameproofing agents are compounds which contain phosphorus-nitrogen bonds, such as phosphonitrilic chloride, phosphoric ester amides, phosphoric ester amines, phosphoramides, phosphonamides, phosphinamides, tris(aziridinyl)phosphine oxide or tetrakis-(hydroxymethyl)phosphonium chloride. These flame-retardant additives are for the most part commercially available.

Further suitable flameproofing agents are hydroxides of magnesium, which are, if required, coated with silane compounds.

Further halogen-containing flameproofing agents are tetrabromobenzene, hexachlorobenzene and hexabromobenzene and halogenated polystyrenes and polyphenylene ethers.

The halogenated phthalimides described in DE 19 46 924 may also be used. Among these, N,N'-ethylenebistetrabromophthalimide has become particularly important.

Antioxidants and heat stabilizers which may be added to the thermoplastic materials according to the invention are, for example, halides of metals of the first group of the Periodic Table, for example sodium, potassium or lithium halides, if required in combination with copper(I) halides, for example chlorides, bromides or iodides. Zinc fluoride and zinc chloride may also be used. Sterically hindered phenols, hydroquinones, substituted members of this group and mixtures of these compounds may also be used, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Materials for increasing the shielding against electromagnetic waves such as metal flakes, metal powders, metal fibers or metal-coated fillers, may also be present.

Lubricants and mold release agents, which are added as a rule in amounts of up to 1% by weight, based on the thermoplastic material, are stearic acid, stearyl alcohol, alkyl stearates and stearamides and esters of pentaerythritol with long-chain fatty acids.

The additives also include stabilizers which prevent the decomposition of the red phosphorus in the presence of moisture and atmospheric oxygen. Examples are compounds of cadmium, of zinc, of aluminum, of silver, of iron, of copper, of antimony, of tin, of magnesium, of manganese, of vanadium, of boron, of aluminum and of titanium. Particularly suitable compounds are, for example, oxides of the stated metals, and carbonates or basic carbonates, hydroxides and salts of organic or inorganic acids, such as acetates or phosphates or hydrogen phosphates and sulfates.

The novel molding materials contain, as preferred stabilizers, at least one phosphorus-containing inorganic acid or a derivative thereof in amounts of up to 1000, preferably from 30 to 200, in particular from 50 to 130, ppm, based on the phosphorus content of the compounds.

Preferred acids are hypophosphorous acid, phosphorous acid and phosphoric acid and salts thereof with alkali metals, sodium and potassium being particularly preferred. Organic derivatives of these acids are to be understood as meaning preferably acid derivatives of the abovementioned acids with fatty acids, the fatty acids being of 12 to 44, preferably 22 to 40, carbon atoms. Examples are stearic acid, behenic acid, palmitic acid and montanic acid.

Examples of UV stabilizers, which are used in general in amounts of up to 2% by weight, based on the molding material, are various substituted resorcinols, salicylates, benzotriazoles and benzophenones.

Organic dyes, such as nigrosine, and pigments, such as titanium dioxide, cadmium sulfide, cadmium selenide, phthalocyanines, ultramarine blue and carbon black, may furthermore be added as colorants.

Lubricants and mold release agents, which are usually used in amounts of up to 1% by weight, are preferably long-chain fatty acids (eg. stearic acid or behenic acid), salts thereof (eg. calcium or zinc stearate) or ester derivatives (eg. stearyl stearate or pentaerythrityl tetrastearate) and amide derivatives (eg. ethylenebisstearylamide).

Examples of plasticizers are dioctyl phthalate, dibenzyl phthalate, butyl benzyl phthalate, hydrocarbon oils, N-(n-butyl)benzenesulfonamide and o- and p-tolylsulfonamide.
Rubber A rubber is defined as a polymer which increases the impact strength of polyphenylene ethers and/or of polyamides. In a specific case, the rubber used as the component differs from the other components (a), (b), (c), (d) and (f) used. Suitable rubbers which increase the toughness of polyphenylene ethers are: polyoctenylenes, graft rubbers having a crosslinked, elastomeric core, which is derived, for example, from butadiene, isoprene or alkyl acrylates, and a graft shell of polystyrene, and furthermore copolymers of ethylene and acrylates or methacrylates and the ethylene/propylene (EP) and ethylene/propylene/diene (EPDM) rubbers, and the EP or EPDM rubbers grafted with styrene.

Furthermore, block copolymers having up to six, preferably up to four, identical or different blocks which may be linked both linearly and in a star-like manner (radial block copolymers) may be used.

Mixtures of block copolymers having different structures, for example mixtures of two-block and three-block copolymers or of hydrogenated and unhydrogenated block copolymers, may likewise be used.

Polymers toughened by adding the stated rubbers are known per se and are described in the literature. Merely by way of example, reference may be made here to U.S. Pat. No. 4,085,163, U.S. Pat. No. 41,103, U.S. Pat. No. 3,149,182, U.S. Pat. No. 3,231,635 and U.S. Pat. No. 3,462,162. Appropriate products are also commercially available.

Rubbers which increase the toughness of polyamides generally have two important features: they contain an elastomeric fraction which has a glass transition temperature of less than −10° C., preferably less than −30° C., and they contain at least one functional group which is capable of reacting with the polyamide. Suitable functional groups, for example, are carboxyl, carboxylic anhydride, carboxylic ester, carboxamido, carboximido, amino, hydroxyl, epoxy, urethane and oxazoline groups.

Examples of rubbers which increase the toughness of polyamides are the following:

EP and EPDM rubbers which were grafted with the abovementioned functional groups. Suitable graft reagents are, for example, maleic anhydride, itaconic acid, acrylic acid, glycidyl acrylate and glycidyl methacrylate. These monomers may be grafted onto the polymer in the melt or in solution, in the presence or absence of a free radical initiator, such as cumyl hydroperoxide.

Other examples are copolymers of α-olefins. The α-olefins are usually monomers of 2 to 8 carbon atoms, preferably ethylene and propylene. Comonomers which have proven suitable are alkyl acrylates or alkyl methacrylates derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate. Mixtures of different comonomers may also be used. Copolymers of ethylene with ethyl or butyl acrylate and acrylic acid and/or maleic anhydride have proven particularly suitable.

The copolymers can be prepared in a high pressure process at from 400 to 4500 bar or by grafting the comonomers onto the poly-α-olefin. The proportion of the α-olefin in the copolymer is in general from 99.95 to 55% by weight.

A further group of suitable elastomers comprises core-shell graft rubbers. These are graft rubbers which are prepared in emulsion and comprise at least one hard and one soft component. A hard component is usually understood as meaning a polymer having a glass transition temperature of at least 25° C., and a soft component as meaning a polymer having a glass transition temperature of not more than 0° C. These products have a structure comprising a core and at least one shell, the structure being determined by the order of addition of the monomers. The soft components are derived in general from butadiene, isoprene, alkyl acrylates or alkyl methacrylates and, if required, further comonomers. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The hard components are derived in general from styrene, α-methylstyrene and copolymers thereof, acrylonitrile, methacrylonitrile and methyl methacrylate preferably being mentioned as comonomers here.

Preferred core-shell graft rubbers contain a soft core and a hard shell or a hard core, a first soft shell and at least one further hard shell. Functional groups, such as carbonyl, carboxyl, acid anhydride, acid amide, acid imide, carboxylic ester, amino, hydroxyl, epoxy, oxazoline, urethane, urea, lactam or halobenzyl groups, are preferably incorporated here by adding suitable functionalized monomers during the polymerization of the last shell. Suitable functionalized monomers are, for example, maleic acid, maleic anhydride, mono- or diesters of maleic acid, tert-butyl (meth)acrylate, acrylic acid, glycidyl (meth)acrylate and vinyloxazoline. The amount of monomers having functional groups is in general from 0.1 to 25, preferably from 0.25 to 15, % by weight, based on the total weight of the core-shell graft rubber. The weight ratio of soft to hard components is in general from 1:9 to 9:1, preferably from 3:7 to 8:2.

Rubbers of this type, which increase the toughness of polyamides, are known per se and are described, for example, in EP 0 208 187.

It is of course also possible to use mixtures of different rubbers.

Preparation of thermoplastic molding materials

The novel, thermoplastic molding materials reinforced according to one embodiment can be prepared by processes known per se, by mixing the starting components in a conventional mixing apparatus, such as an extruder, preferably a twin-screw extruder, a Brabender mill or a Banbury mill, and then extruding the mixture. After extrusion, the extrudate is cooled and comminuted.

Thorough mixing is advantageous for obtaining a very homogeneous molding material. The novel molding materials are usually prepared as described below:

The components (a) to (c), according to one embodiment (d), and, if required, (e) are generally melted and mixed in the melt at from 200 to 320° C., preferably from 250 to 300° C., in particular 280° C., in an extruder, roll mill or kneader, preferably a twin-screw extruder, during a residence time of from 0.5 to 10 minutes. Solutions of the components (b), (a) and (c) or partial mixtures thereof may also be prepared and mixed, the solvents then evaporated and the mixtures, according to one embodiment of the invention, mixed with the reinforcing agent (d) and, if required, further additives (e) and the mixture further compounded. According to one embodiment, the components (a), (b) and (c) are preferably mixed in the presence of, or with the addition of, the reinforcing agents (d).

It is also possible to premix some or all of the component (a) with at least one other component or with the reinforcing agent (d).

In a preferred process for the preparation of the thermoplastic molding materials reinforced according to one embodiment of the invention, the components (a), (b), (c), (d) and, if required, (e) are mixed in an extruder at from 200 to 320° C., component (d) being coated with component (a), and the coated component (d) being introduced into an orifice of the extruder and being mixed in the extruder with the molten components (b) and (c) and, if required, (e).

The novel molding material is particularly preferably prepared in the following manner:

The functionalized copolymer of component (a) is melted or dissolved and directly added to the glass roving of reinforcing agent (d), or the latter is impregnated with the dispersion or solution and is introduced together with the glass fibers through an orifice of the extruder into the latter and combined with the melt of components (b) and (c) and, if required, (e), if required the solvent or dispersing medium being evaporated or being stripped off under reduced pressure.

Novel materials can also be prepared by a pultrusion process as described in EP-A-56 703. In this process, the glass roving is impregnated with the polymer material and then cooled and comminuted. In this case, the glass fiber length is identical to the granule length and is from 3 to 20 mm.

The residence times are in general from 0.5 to 50, preferably from 4 to 24, hours.

Moldings can then be produced from the molding materials, for example by means of conventional apparatuses for blow molding, profile extrusion and pipe extrusion or injection molding.

The thermoplastic molding materials prepared in this manner have a balanced property profile, in particular very good tensile strength and flowability in combination with good rigidity, particularly with the use of the reinforcing agent (d).

According to the invention, moldings, in particular injection moldings, fibers and films, consisting essentially of the molding materials described are therefore also provided.

Thermoplastic molding materials containing polyamide

We have found that the objects of the present invention are achieved by the thermoplastic molding material which is described in the claims, is reinforced according to one embodiment and contains polyamide.

This molding material contains (a) from 0.1 to 40% by weight of at least one functionalized copolymer as defined in one of the copolymer claims,
(b) from 1 to 98.9% by weight of at least one polyphenylene ether,
(c) from 0 to 97.9% by weight of at least one vinylaromatic polymer,
(d) from 0 to 50% by weight of at least one reinforcing agent,
(e) from 0 to 60% by weight of further additives and/or processing assistants and
(f) from 1 to 98.9% by weight of at least one polyamide, the amounts of components (a) to (f) together being 100% by weight.

Preferably, these novel thermoplastic molding materials contain 0.2–35, in particular 5–20, % by weight of component (a), 1–97.9, particularly preferably 20–80, in particular 25–50, % by weight of component (b), 0–50, in particular 0–30, % by weight of component (c), 1–50, particularly preferably 4–45, in particular 10–40, % by weight of component (d), 1–97.9, particularly preferably 0–30, in particular 0–20, % by weight of component (e) and 1–97.9, particularly preferably 15–75, in particular 30–60, % by weight of component (f).

The amounts of components (a) to (f) together are always 100% by weight.

The components (a) to (e) are as described above and are used in the amounts stated here.

The component (f) is described in more detail below.

Polyamides of component (f)

Polyamides of component (f) may be thermoplastic semicrystalline polyamides. The semicrystalline polyamides are as a rule linear.

Such polyamides can be prepared, for example, by condensation of equimolar amounts of a saturated dicarboxylic acid of 4 to 12 carbon atoms with a diamine of 4 to 14 carbon atoms or by condensation of ω-aminocarboxylic acids or polyaddition of lactams.

Examples of suitable polyamides are polyhexamethyleneadipamide, polyhexamethyleneazelaamide, polyhexamethylenesebacamide, polyhexamethylenedodecanediamide, polytetramethyleneadipamide and the polyamides obtained by ring cleavage of lactams, such as polycaprolactam and polylaurolactam.

A polyamide (f) from the following group is particularly preferred: polytetramethyleneadipamide, polyhexamethyleneadipamide, polyhexamethylenesebacamide, polycaprolactam, copolyamides obtained from terephthalic acid, hexamethylenediamine and ε-caprolactam, and copolyamides obtained from terephthalic acid, isophthalic acid, hexamethylenediamine and, if required, adipic acid, the amount of terephthalic acid and of hexamethylenediamine together being less than 50% by weight, based on the copolyamide. From this group, polyhexamethyleneadipamide and polycaprolactam are particularly preferred. Mixtures of different polyamides may also be used.

In preferred thermoplastic molding materials, the difference between the $NH_2$ and COOH terminal groups of the polyamides used is less than 70, in particular less than 40, particularly preferably from 10 to 30, mmol/kg. These values are determined by known methods.

Preferably, polyamides having a viscosity number of from 40 to 250, in particular from 40 to 150, ml/g, measured according to DIN 53426, are used.

Low molecular weight polyamides or polyamide prepolymers can be prepared, for example, by the processes described in EP 0 129 195, EP 0 129 196 and EP 0 299 444. Further batchwise and continuous preparation processes are known to a person skilled in the art.

In a preferred procedure, the low molecular weight polyamide is passed in molten form through a discharge zone with simultaneous removal of the residual water contained in the melt. Suitable discharge zones are, for example, devolatilization extruders. The melt freed from the water in this manner is then extruded and granulated. The granules obtained are melted, preferably in a twin-screw extruder, at about 20° C. above their melting point (in the case of polyhexamethyleneadipamide at about 280° C.) and are mixed with functionalized polymer, the polyphenylene ether and, if required, the rubber and the additives or processing assistants, the mixture is extruded and the extrudate is cooled and granulated.

The novel thermoplastic molding materials which contain polyamide may be free of vinylaromatic polymers. According to one embodiment of the invention, however, they may contain 0–97.9, preferably 0–50, in particular 0–35, % by weight of at least one vinylaromatic polymer component (c). They may thus be polyphenylene ether/polyamide blends or polyphenylene ether/polyamide/vinylaromatic blends.

The novel thermoplastic molding materials can be prepared by processes known per se, as described above for the reinforced thermoplastic molding materials, except that a polyamide is now used as the further component (f) and, according to one embodiment, component (c) can be dispensed with.

According to one embodiment of the invention, the components (a) to (e) are mixed, preferably in an extruder, and component (f) is then metered into the mixture of components (a) to (e), preferably in a heated form in a side extruder. Any reinforcing agents (d) present, which may have been precoated with (a) according to one embodiment of the invention, can be incorporated into the first mixture or metered in together with the polyamide (f).

The thermoplastic molding materials prepared in this manner have a balanced property profile, in particular a very good toughness/rigidity ratio, especially when the the reinforcing agent (d) is used.

According to the invention, moldings are also provided from thermoplastic molding materials which can be prepared by the process described above.

In the Examples below, the invention is described in more detail with reference to reinforced molding materials.

EXAMPLES

Example 1

The functionalized styrene/butadiene block copolymer component (a) having an average polystyrene molecular weight of 29,000 and an average polybutadiene molecular weight of 36,000 was used (a1). The second component (a) had an average polystyrene molecular weight of 57,000 and an average polybutadiene molecular weight of 65,000 (a2), the molecular weight in each case being $M_n$. Both styrene/butadiene block copolymers carried terminal anhydride groups and were prepared as described below.

The functionalized block copolymer (a1) was prepared as follows: 3200 ml of dry cyclohexane and 0.3 ml of 1,1-diphenylethylene were initially taken in a blanketed 6 l stirred kettle. 1.5 Molar secondary butyllithium solution (in 92/8 cyclohexane/isopentane) was then added until a red color persisted. A further 8 ml of the butyllithium solution were then added. 400 ml of high-purity styrene were then added dropwise at 60° C. in the course of 2 hours. After stirring had been carried out for a further hour, 548 ml of purified butadiene were added dropwise. Stirring was then carried out for a further hour. Finally, 7 ml of 1,1-diphenylethylene were added, after which stirring was carried out for a further half hour and finally the mixture was cooled to 20° C. In a further blanketed 6 l stirred kettle, in the meantime 30 g of trimellitic anhydride chloride in 300 ml of dry tetrahydrofuran were initially taken and were cooled to 0° C. The content of the first stirred kettle was then added dropwise in the course of from 1 to 2 hours. After a further reaction time of 1 hour, the resulting styrene/butadiene block copolymer was precipitated with petroleum ether, filtered off with suction and dried. The anhydride-modified block copolymer thus prepared had an average molecular weight (GPC in $CHCl_3$ against polystyrene calibration standards) of 65,000 ($M_n$).

The functionalized block copolymer (a2) was prepared in the same manner, apart from the use of 4.5 instead of 8 ml of a 1.5 molar secondary butyllithium solution as initiator. The average molecular weight of the functionalized styrene/butadiene block copolymers obtained was 122,000 ($M_n$).

The degree of functionalization of the functionalized polymers (a1) and (a2) was determined by $^1$H-NMR.

The following degrees of functionalization were obtained:
(a1) 90%
(a2) 85%

Example 2

For comparison purposes, the functionalized block copolymers (a3) and (a4) were prepared similarly to the indirect functionalization method for polystyrene, described by Barlow and Paul (loc. cit.). These functionalized styrene/butadiene block copolymers not according to the invention were thus prepared without diphenylethylene. Both styrene/butadiene polycopolymers (a3) and (a4) carried terminal anhydride groups. Polymer (a3) had an average polystyrene molecular weight of 30,000 and an average polybutadiene molecular weight of 30,000 ($M_n$). The degree of functionalization was 30%.

The other polymer (c4) had an average polystyrene molecular weight of 60,000 and an average polybutadiene molecular weight of 60,000 (in each case $M_n$). The degree of functionalization was 25%.

The degree of functionalization of the functionalized polymers (c3) and (c4) was determined by $^1$H-NMR.

Example 3

As a further comparative polymer, a styrene/maleic anhydride copolymer prepared in solution by free radical polymerization was produced as a block copolymer component (a5). This polymer had a maleic anhydride content of 2.5% by weight.

Examples 4–24

Molding Materials

Poly-2,6-dimethyl-1,4-phenylene ether having an intrinsic (relative) viscosity of 0.55 dl/g, measured at a concentration of about 1% by weight in chloroform at 25° C., was used as component (b).

Three polystyrenes were used as component (c):
(c1) is a high impact polystyrene KR2756 from BASF AG, containing 8% by weight of butadiene and having a melt flow index of 3 g/10 min, measured according to DIN 53735 at 200° C. and 5 kg load.
(c2) is a general-purpose polystyrene 148 H from BASF AG with the following properties:
VST/B/50(ISO 306)=101° C.
MVR 200/5(ISO 1133)=4.5
(c3) is a copolymer of 95% by weight of styrene and 5% by weight of tert-butyl acrylate, having a viscosity number of 1.0 dl/g. It was prepared by the process described in EP-A-0 319 833 for component B, cf. page 6, line 57 et seq.

The following glass fibers were used as component (d):
A chopped glass fiber which had an average fiber diameter of 14 μm and an aminosilane size and is obtainable, for example, under the name OCF$^R$R 44DX2 from Owens Corning Fiberglass Corp. was used as component (d1).

The chopped glass fiber 5145EC14 from Vetrotex International S.A., which had a diameter of 1 μm and a silane size, was used as component (d2).

A rubber component which comprised a styrene/butadiene 4-block copolymer and had a styrene content of 41% by weight and a Shore A hardness of 87 (according to DIN 53505) was used as component (e).

Polyamide 66 having a viscosity of 144 ml/g was used as polyamide (f).

Preparation of the molding materials

The components (a), (b), (c), (d), (e) and (f), if present, were compounded, in the amounts by weight stated in Tables 1, 3 and 5, in all Examples in a twin-screw extruder which operated at 200 rpm. The temperature was 280° C. 20 kg per hour were processed. After extrusion, the molding material was granulated and finally processed by the injection molding method at 280° C. to give the corresponding moldings.

The flowability (melt volume rate, MVR 250° C./21.6 kg), measured according to DIN 53 735, the tensile strength (elongation at break), measured according to DIN 53 455, and the modulus of elasticity, measured according to DIN 53 457, and the notched impact strength, measured according to DIN 53 453, are shown in the Tables, if they have been determined.

In Tables 1 and 2 below, novel molding materials comprising functionalized copolymer (a), polyphenylene ether (b), vinylaromatic polymer (c) and reinforcing agent (d) are compared with comparison materials which contain no functionalized copolymer (a).

TABLE 1

Compositions (in % by weight) of the novel Examples and Comparative Experiments (=*).

| | Comp. (a) | Comp. (b) | Comp. (c) | Comp. (d) |
|---|---|---|---|---|
| 4* | — | 40 | 20 c1<br>10 c2 | 30 d1 |
| 5 | 5 a1 | 40 | 20 c1<br>5 c2 | 30 d1 |
| 6 | 5 a2 | 40 | 20 c1<br>5 c2 | 30 d1 |
| 7* | — | 40 | 20 c1<br>5 c2<br>5 c3 | 30 d1 |
| 8* | — | 40 | 20 c1<br>20 c2 | 20 d2 |
| 9 | 5 a1 | 40 | 20 c1<br>15 c2 | 20 d2 |

TABLE 2

Properties of the novel Examples and Comparative Experiments (=*).

| | MVR [ml/10 min] | Impact strength [kJ/m$^2$] | Elongation at break [%] |
|---|---|---|---|
| 4* | 11 | 19 | 1.7 |
| 5 | 18 | 32 | 2.4 |
| 6 | 16 | 34 | 2.6 |
| 7* | 9 | 22 | 1.9 |
| 8* | 25 | 25 | 2.3 |
| 9 | 34 | 38 | 3.0 |

Table 2 shows that the novel reinforced thermoplastic molding materials simultaneously have high flowability, elongation at break and impact strength, in contrast to the polymers of the Comparative Examples, which either have high flowability but low impact strength and elongation at break or poor flowability and poor elongation at break in conjunction with acceptable impact strength. The novel Examples 5, 6 and 9 all have a substantial advantage over Comparative Examples 4, 7 and 8.

In Tables 3 and 4, the novel molding materials which contain a functionalized copolymer (a), a polyphenylene ether (b), at least one vinylaromatic polymer (c) and reinforcing agent (d) are compared with molding materials which contain comparative components (a3) and (a4) prepared according to Barlow and Paul and having a low degree of functionalization.

TABLE 3

Composition (in % by weight) of the novel Examples
and Comparative Experiments (=*).

| | Degree of functionalization | Comp. (a) | Comp. (b) | Comp. (c) | Comp. (d) |
|---|---|---|---|---|---|
| 10* | 30% | 5 a3 | 40 | 20 c1<br>5 c2 | 30 d1 |
| 5 | 90% | 5 a1 | 40 | 20 c1<br>5 c2 | 30 d1 |
| 11* | 25% | 2 a4 | 43 | 20 c1<br>5 c2 | 30 d1 |
| 12 | 85% | 2 a2 | 43 | 20 c1<br>5 c2 | 30 d1 |
| 13* | 30% | 10 a3 | 35 | 20 c1<br>15 c2 | 20 d2 |
| 14 | 90% | 10 a1 | 35 | 20 c1<br>15 c2 | 20 d2 |

TABLE 4

Properties of the novel Examples and
Comparative Experiments

| | MVR<br>[ml/10 min] | Impact strength<br>[kJ/m²] | Elongation at<br>break [%] |
|---|---|---|---|
| 10* | 12 | 19 | 1.9 |
| 5 | 18 | 32 | 2.4 |
| 11 | 10 | 20 | 1.5 |
| 12 | 9 | 23 | 1.8 |
| 13* | 28 | 30 | 2.3 |
| 14 | 28 | 35 | 2.9 |

Table 4 shows that the novel molding materials containing a functionalized copolymer (a) with a high degree of functionalization have a substantially higher impact strength and elongation at break compared with comparative molding materials which contain a functionalized copolymer (a) with a low degree of functionalization.

In Tables 5 and 6 below, the novel molding materials which contain a functionalized copolymer (a), a polyphenylene ether (b), a rubber (e) and a polyamide (f) are compared with comparative materials which contain, as component (a5), an unfunctionalized styrene/maleic anhydride copolymer.

TABLE 5

Compositions (in % by weight) of the novel Examples
and Comparative Experiments (=*)

| Example | Comp. (a) | Comp. (b) | Comp. (e) | Comp. (f) |
|---|---|---|---|---|
| 15 | a1:5 | 45 | | 50 |
| 16 | a1:10 | 40 | | 50 |
| 17 | a1:20 | 30 | | 50 |
| 18 | a2:10 | 40 | | 50 |
| 19 | a1:5 | 40 | 5 | 50 |
| 20 | a1:5 | 35 | 10 | 50 |
| 21* | a5:10 | 40 | | 50 |
| 22* | a5:5 | 35 | 10 | 50 |
| 23* | a3:5 | 35 | 10 | 50 |
| 24* | a4:5 | 35 | 10 | 50 |

TABLE 6

Properties of the novel Examples
and Comparative Experiments (=*)

| Example | Notched impact strength<br>[kJ/m²] | Modulus of elasticity<br>[N/mm²] |
|---|---|---|
| 15 | 38 | 3.150 |
| 16 | 45 | 3.090 |
| 17 | 57 | 3.020 |
| 18 | 48 | 3.050 |
| 19 | 62 | 2.780 |
| 20 | 65 | 2.450 |
| 21* | 3 | 2.950 |
| 22* | 59 | 2.100 |
| 23* | 27 | 2.200 |
| 24* | 23 | 2.200 |

The Tables show that the novel thermoplastic molding materials simultaneously have great toughness and rigidity in contrast to comparative molding materials which have either a high modulus of elasticity and low notched impact strength or high notched impact strength and a lower modulus of elasticity. The novel Examples 15 to 20 all differ substantially from the Comparative Examples 21 to 24.

We claim:

1. A functionalized copolymer of the formula

A—B—Z—X where

A is a block of vinylaromatic monomers of 8 to 20 carbon atoms;

B is a block of alkadiene monomers of 4 to 12 carbon atoms;

Z is a fundamental building block of a compound having sterically hindering groups; and X is a functionalized fundamental building block resulting from reaction of a living copolymer A—B—Z<sup>⊖</sup> 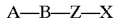 with a difunctional or polyfunctional compound selected from the group consisting of the 1,2-anhydride or 1,2-anhydride chloride of 1,2,4-benzenetricarboxylic acid, chloroethanolyl succinic anhydride, chloroformylsuccinic anhydride and 1-acetoxyacetyl-3,4-phthalic anhydride, and wherein the degree of functionalization of the copolymer is at least 85%.

2. A functionalized copolymer as defined in claim 1, wherein A is a block of styrene and/or α-methylstyrene and/or B is a block of butadiene and/or isoprene.

3. A functionalized copolymer as defined in claim 1, wherein Z is a fundamental building block of the formula

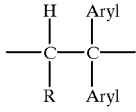

where R is hydrogen or $C_1$–$C_4$-alkyl; and Aryl is $C_6$–$C_{10}$-aryl.

4. A functionalized copolymer as defined in claim 1, wherein the functionalized fundamental building block contains a terminal acid anhydride group or amino group.

5. A process for the preparation of a functionalized copolymer as defined in claim 1, wherein a) vinylaromatic monomers and alkadiene monomers are subjected to anionic polymerization to give a first living copolymer of the formula A—B$^{31}$ containing a block A and a block B, b) the first living copolymer is reacted with a compound having sterically hindering groups to give a second living copolymer of the formula A—B—Z$^\ominus$ and c) the second living copolymer is reacted with a functional group of a difunctional or polyfunctional compound to give a copolymer of the formula A—B—Z—X, where A, B, Z and X are defined in claim 1.

6. A thermoplastic molding material containing (a) from 0.1 to 20% by weight of at least one functionalized copolymer as defined in claim 1, (b) from 1 to 98.9% by weight of at least one polyphenylene ether, (c) from 1 to 98.9% by weight of at least one vinylaromatic polymer, (d) from 0 to 50% by weight of at least one reinforcing agent and (e) from 0 to 60% by weight of further additives and/or processing assistants, the amounts of the components (a) to (e) together being 100% by weight.

7. A process for the preparation of unreinforced or reinforced, thermoplastic molding materials as defined in claim 6, wherein the components (a), (b), (c), (d) and (e), if present, are mixed in an extruder at from 200 to 320° C., if required component (d) being coated with component (a), and the coated component (d) being introduced into an orifice of an extruder and being mixed in the extruder with the molten components (b) and (c) and, if required, (e).

8. A thermoplastic molding material containing (a) from 0.1 to 40% by weight of at least one functionalized copolymer as defined in claim 1, (b) from 1 to 98.9% by weight of at least one polyphenylene ether, (c) from 0 to 97.9% by weight of at least one vinylaromatic polymer, (d) from 0 to 50% by weight of at least one reinforcing agent and (e) from 0 to 60% by weight of further additives and/or processing assistants and (f) from 1 to 98.9% by weight of at least one polyamide, the amounts of the components (a) to (f) together being 100% by weight.

9. A process for the preparation of unreinforced or reinforced, thermoplastic molding materials as defined in claim 8, wherein the components (a), (b), (c), (d), (e) and (f), if present, are mixed in an extruder at from 200 to 320° C., component (f) being introduced into an orifice of an extruder and being mixed in the extruder with the molten components (a), (b), (c) and (e), and it being possible for component (d) to be mixed with component (f) and/or with components (a), (b), (c) and (e).

10. A molding comprising a molding material as defined in claim 7 or 8.

11. A functionalized copolymer as defined in claim 1, wherein A is a block of vinylaromatic monomers of 8 to 12 carbon atoms.

12. A functionalized copolymer as defined in claim 1, wherein B is a block of alkadiene monomers of 4 to 8 carbon atoms.

13. A process for producing injection moldings, fibers and films by melt extrusion of the thermoplastic molding material defined in claim 6.

14. The process of claim 5, wherein said difunctional or polyfunctional compound is the 1,2-anhydride chloride of 1,2,4-benzenetricarboxylic acid.

\* \* \* \* \*

UNITED STATES PATENT AND TRADEMARK OFFICE
CERTIFICATE OF CORRECTION

PATENT NO. : 6,043,315
DATED : March 28, 2000
INVENTOR(S) : GOTTSCHALK et al.

It is certified that error appears in the above-identified patent and that said Letters Patent is hereby corrected as shown below:

IN THE CLAIMS

Column 22, claim 5, line 66, change "A—B$^{31}$" to -- A-B$^-$

Column 24, claim 10, line 21, delete "7 or".

Signed and Sealed this

Twentieth Day of February, 2001

Attest:

NICHOLAS P. GODICI

Attesting Officer   Acting Director of the United States Patent and Trademark Office